United States Patent [19]
Hess et al.

[11] Patent Number: 5,962,592
[45] Date of Patent: Oct. 5, 1999

[54] ETHYLENE COPOLYMER COMPOSITIONS

[75] Inventors: Kevin J. Hess, Bartlesville; Charles D. Houser, Copan; Rolf L. Geerts, Bartlesville, all of Okla.

[73] Assignee: Phillips Petroleum Company, Bartlesville, Okla.

[21] Appl. No.: 08/999,750

[22] Filed: Aug. 5, 1997

Related U.S. Application Data

[63] Continuation of application No. 08/433,782, May 3, 1995, abandoned.

[51] Int. Cl.$^6$ ....................................................... C08F 8/00
[52] U.S. Cl. ............................................. 525/232; 525/263
[58] Field of Search ...................................... 525/269, 732

[56] References Cited

U.S. PATENT DOCUMENTS

| | | | |
|---|---|---|---|
| 3,974,132 | 8/1976 | Valdiserri | 525/263 |
| 5,246,783 | 9/1993 | Spenadel et al. | 428/461 |

*Primary Examiner*—Bernard Lipman
*Attorney, Agent, or Firm*—Richmond, Hitchcock, Fish & Dollar; Carl D. Corvin

[57] ABSTRACT

An ethylene copolymer composition is provided that comprises: (a) an ethylene copolymer that has been produced with a metallocene catalyst system; (b) a crosslinking agent; and (c) a crosslinking coagent. This composition when crosslinked exhibits outstanding physical properties.

48 Claims, No Drawings

ETHYLENE COPOLYMER COMPOSITIONS

This application is a File Wrapper Continuation of application Ser. No. 08/433,782, now abandoned.

BACKGROUND

This invention is related to the field of ethylene copolymer compositions. In particular, this invention is related to the field of crosslinked ethylene copolymer compositions.

There has been, and continues to be, considerable interest in converting thermoplastic ethylene copolymer compositions into thermosetting ethylene copolymer compositions. This interest is due to the desire to combine the low cost, easy processing, and good mechanical properties of thermoplastic ethylene copolymer compositions with the enhanced form stability at elevated temperatures, resistance to stress crack, and good tensile properties of thermosetting ethylene copolymer compositions. Crosslinked ethylene copolymer compositions are valuable because they can be use in the wire, cable, pipe, hose, and molded article industries.

Tensile properties are perhaps the most important indicators of the useful strength of a crosslinked ethylene copolymer composition. For example, the tensile property known as *"Percent Elongation at Break"* is a good indicator of the brittleness of an ethylene copolymer composition and the tensile property known as the *"Strain Energy at Break"* is a good indicator of the general toughness of an ethylene copolymer composition. These properties are widely known and can be determined on commercially available test equipment.

SUMMARY

It is an object of this invention to provide an ethylene copolymer composition that has improved physical properties.

It is another object of this invention to provide a crosslinkable ethylene copolymer composition that has improved strain energy at break, and improved elongation at break, and improved tensile strength at break.

In accordance with this invention an ethylene polymer composition is provided that comprises an ethylene copolymer composition that comprises: (a) an ethylene copolymer that has been produced with a metallocene catalyst system; and (b) a crosslinking agent.

These and other objects, features, aspects, and advantages of this invention will become better understood with references to the following Detailed Description of the Invention and the claims.

DETAILED DESCRIPTION OF THE INVENTION

The ethylene copolymers used in this invention comprise ethylene and an alpha-olefin that has from 3 to about 18 carbon atoms. It is preferred, however, if such alpha-olefins are selected from the group consisting of 1-butene, 3-methyl-1-butene, 1-pentene, 3-methyl-1-pentene, 4-methyl-1-pentene, 1-hexene, 3-ethyl-1-hexene, 1-heptene, 1-octene, 1-nonene, and 1-decene. Additionally, it is preferred if such copolymers comprise from about 80 to about 99 percent by weight ethylene.

The ethylene copolymers used in this invention preferably have a density in the range of about 0.85 to about 0.96 grams per cubic centimeter as determined in accordance with ASTM D1505. However, it is more preferred, when the ethylene copolymer has a density in the range of about 0.94 to about 0.96 grams per cubic centimeter. The ethylene copolymers preferably have a melt index in the range of about 0.01 to about 100 grams per 10 minutes as determined in accordance with ASTM D1238, Condition 190/2.16. However, it is more preferred, when the melt index of such copolymers are in the range of about 3 to about 40 grams per 10 minutes. Most preferably, such ethylene copolymers have a melt index in the range of 10 to 35 grams per 10 minutes.

These ethylene copolymers can be polymerized by any known method in the art. While not wanting to be bound by theory, it is believed that regular spacing of the comonomer side chains along the copolymer molecular structure helps to provide, in part, the unexpected benefits of this invention. Currently, it is preferred, to have the ethylene copolymers produced by metallocene catalyst systems. Examples of suitable metallocene catalyst systems, their preparation, and their use in polymerization processes are described in detail in U.S. Pat. Nos. 5,091,352; 5,057,475; 5,124,418; 5,191,132; 5,347,026; and EP 524,624 published Jan. 27, 1993, the disclosures of which are incorporated herein by reference.

Polymerization can be carried out in any manner known in the art, such as gas phase, solution, or slurry conditions, to effect polymerization. A stirred reactor can be utilized for a batch process, or the reaction can be carried out continuously in a loop reactor or in a continuous stirred reactor.

A preferred polymerization technique is that which is referred to as a particle-form, or slurry, process wherein the temperature is kept below the temperature at which polymer goes into solution. Such polymerization techniques are well known in the art and are disclosed, for instance, in Norwood, U.S. Pat. No. 3,248,179 the disclosure of which is hereby incorporated by reference.

The preferred temperature in the particle form process is within a range of about 150° F. to about 230° F. (66° C. to 110° C). Reactor pressure usually can be within a range of about 300 psig to about 700 psig and preferably is within a range of 400 psig to 600 psig, for best reactor operating parameters. Two preferred polymerization methods for the slurry process are those employing a loop reactor of the type disclosed in Norwood and those utilizing a plurality of stirred reactors either in series, parallel or combinations thereof wherein the reaction conditions, and/or catalyst systems, are different in the different reactors.

The crosslinking agent can be any suitable crosslinking agent for crosslinking ethylene copolymers. However, it is preferred if the crosslinking agent is an organic peroxide crosslinking agent. For example, diperoxy compounds can be employed as the crosslinking agents of the composition of the present invention. Examples of diperoxy compounds suitable for use as the crosslinking agents include acetylenic diperoxy compounds such as hexynes having the formula

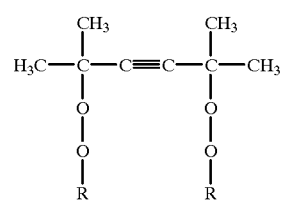

octynes having the formula

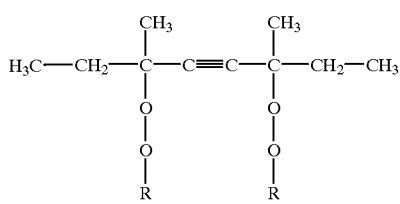

and octadiynes having the formula

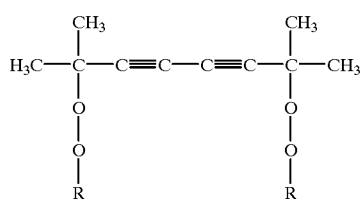

wherein R is selected from the group consisting of tertiary alkyl, alkyl carbonate, and benzoate. The molecular weights of the compounds are generally in the range of from about 200 to about 600. Examples of acetylenic diperoxy compounds described above include:

2,7-dimethyl-1,7-di(t-butylperoxy)octadiyne-3,5;

2,7-dimethyl-2,7-di(peroxy ethyl carbonate)octadiyne-3,5;

3,6-dimethyl-2,6-di(peroxy ethyl carbonate)octyne-4;

3,6-dimethyl-2,6-di(t-butylperoxy)octyne-4;

2,5-dimethyl 2,5-di(peroxybenzoate)hexyne-3;

2,5-dimethyl-2,5-di(peroxy-n-propyl carbonate)hexyne-3;

2,5-dimethyl-2,5-di(peroxy isobutyl carbonate)hexyne-3;

2,5-dimethyl-2,5-di(alpha-cumyl peroxy)hexyne-3;

2,5-dimethyl-2,5-di(peroxy ethyl carbonate)hexyne-3;

2,5-dimethyl-2,5-di(peroxy beta-chloroethyl carbonate) hexyne-3; and 2,5-dimethyl-2,5-di(t-butylperoxy)hexyne-3.

Other diperoxy compounds suitable for use as the crosslinking agent of the composition of the present invention include hexanes having the formula

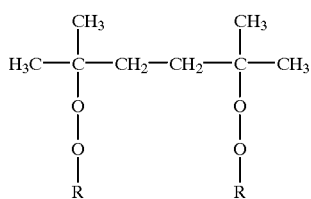

and octanes having the formula

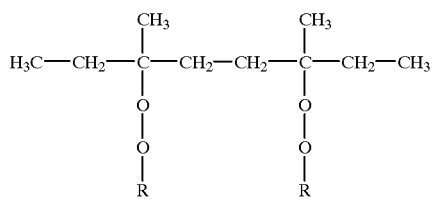

wherein R is selected from the group consisting of tertiary alkyl, alkyl carbonate, and benzoate. The molecular weights of the compounds are generally in the range of from about 200 to about 600. Examples of diperoxy compounds described above include:

3,6-dimethyl-2,6-di(t-butylperoxy)octane;

3,6-dimethyl-2,6-di(peroxy ethyl carbonate)octane;

2,5-dimethyl-2,5-di(peroxybenzoate)hexane;

2,5-dimethyl-2,5-di(peroxy isobutyl carbonate)hexane; and 2,5-dimethyl-2,5-di(t-butylperoxy)hexane.

Preferably, the diperoxy compound employed as the crosslinking agent of the composition of the present invention is selected from the group consisting of 2,5-dimethyl-2,5-di(t-butylperoxy)hexyne-3 and 2,5-dimethyl-2,5-di(t-butylperoxy)hexane. Other suitable examples of crosslinking agents are disclosed in U.S. Pat. Nos. 3,214,422 and 4,440,893 the entire disclosures of which are hereby incorporated by reference.

The crosslinking agent is present in the composition in an amount in the range of from about 0.05 weight percent to about 3 weight percent based on the weight of the copolymer. Preferably, the crosslinking agent is present in the composition in an amount in the range of from about 0.05 weight percent to about 1.5 weight percent based on the weight of the copolymer. More preferably, the crosslinking agent is present in the composition in an amount in the range of from about 0.05 weight percent to about 0.8 weight percent based on the weight of the copolymer and most preferably from 0.16 weight percent to 0.48 weight percent based on the weight of the copolymer. A particularly preferred range is from 0.24 weight percent to 0.40 weight percent based on the weight of the copolymer.

However, it should be noted that the amount of "active oxygen" in a crosslinking agent can significantly affect the above weight percents. The term "active oxygen" is well known in the art. In general, it means the active (—O—O—) bonds in a molecule. The amount of active oxygen that should be present in the composition is from about 50 to about 3000 parts per million by weight based on the weight of the copolymer. Preferably, the amount of active oxygen that should be present in the composition is from about 50 to about 1500 parts per million by weight based on the weight of the copolymer. More preferably, the amount of active oxygen that should be present in the composition is from about 50 to about 750 parts per million by weight based on the weight of the copolymer and most preferably from 150 to 470 parts per million by weight based on the weight of the copolymer. A particularly preferred range is from 220 to 390 parts per million based on the weight of the copolymer.

The coagent used in the invention aids the crosslinking agent. The coagent is selected from the group consisting of organic compounds that have allyl ($CH_2$—$CH$=$CH_2$) groups, 1,2 polybutadiene and mixtures thereof. Preferably, the coagent comprises at least one compound selected from the group consisting of compounds having three allyl groups, even more preferably the coagent is selected from the group consisting of triallyl cyanurate, triallyl isocyanurate, triallyl trimellitate and trimethallyl trimellitate. Most preferably, the coagent is selected from the group consisting of triallyl cyanurate, triallyl isocyanurate and triallyl trimellitate.

The coagent is present in the composition in an amount determined by the amount of crosslinking agent used. In particular, the weight ratio of the coagent to the crosslinking agent in the range of about 0.2 to about 4. Preferably, the ratio is from about 0.3 to about 3 and most preferably the ratio is from about 0.5 to about 2.

The ethylene copolymer composition preferably contains hydroperoxide scavengers examples of which are those compounds comprising one or more thioester groups. Examples of compounds having a thioester group include dilauryl thiodipropionate and distearyl thiodipropionate. Further examples of such compounds can be found in U.S. Pat. No. 4,028,332, the entire disclosure of which is hereby incorporated by reference.

The antioxidant employed in the composition of the present invention is preferably present in the composition in an amount in the range of about 0.01 weight percent to about 1 weight percent, more preferably in the range of about 0.05 to about 0.5 weight percent based on the weight of the copolymer. Even more preferably, the antioxidant is present in the composition in an amount in the range of from 0.1 weight percent to 0.3 weight percent based on the weight of the copolymer.

If desired, an antioxidant such as a hindered phenolic antioxidant can be employed in the composition to reduce oxidation of the ethylene copolymer. Examples of these antioxidants include 2,6-di-t-butyl-p-cresol (BHT), tetrakis (methylene(3,5-di-t-butyl-4-hydroxyhydrocinnamate)) methane (IRGANOX 1010) and octadecyl-3,5-di-t-butyl-4-hydroxyhydrocinnamate (IRGANOX 1076). When employed, these antioxidants are present in the composition in an amount in the range of from about 0.01 weight percent to about 0.05 weight percent, more preferably in the range of from 0.01 weight percent to 0.03 weight percent, based on the weight of the copolymer.

The use of the coagent in the composition tends to make the molded parts stick to the mold. If the degree of adhesion is too great, the parts will be difficult to remove from the mold and may be damaged during extraction. On the other hand, if the degree of adhesion is too low, the parts may separate from the mold prematurely during the molding cycle, resulting in the formation of gas pockets between the parts and the mold. Gas pockets between the parts and the mold typically result in the formation of crater-like defects or "pock marks" on the outside surfaces of the parts. Consequently, a mold release agent is typically used in the ethylene copolymer composition. Preferably, the mold release agent employed in the composition is a fatty acid. Fatty acids can be saturated or unsaturated, but saturated fatty acids are preferred. In general, saturated fatty acids have the formula $CH_3(CH_2)_xCOOH$ where "X" is an integer from 2 to 24. Examples of saturated fatty acids are butyric, lauric, palmitic and stearic. Examples of unsaturated fatty acids are oleic, linoleic, and linolenic. A preferred fatty acid is stearic acid.

The mold release agent is preferably present in the composition in an amount in the range of from about 0.05 weight percent to about 1 weight percent, more preferably in the range of from about 0.1 to about 0.5%, based on the weight of the copolymer. Most preferably, the mold release agent is present in the composition in an amount in the range of from about 0.1% to about 0.2% based on the weight of the copolymer.

If desired, other components which do not adversely affect the crosslinking of the ethylene copolymer can be employed in the composition of the present invention. Examples of such components include corrosion inhibitors, pigments, additional stabilizers such as metal complexing agent, antistatic agents, ultraviolet absorbers for light stabilization, carbon black, fillers, reinforcing materials and the like.

The composition of the present invention can be formed by a variety of techniques. For example, the ethylene copolymer can be compounded into pellets and fed, along with the other compounds, into an extruder having either a single mixing screw or twin mixing screws. The pellets thus produced may be ground and used in powder form.

EXAMPLES

These examples are provided to further assist a person skilled in the art with understanding this invention. These examples are intended to be illustrative of the invention and are not meant to be construed as limiting the scope of the invention. In these Examples, densities were determined according to ASTM D1 505-85 and melt indices were determined according to ASTM D1238-90b, condition 190/2.16.

Example One

In this Example, the crosslinking behavior and the resulting crosslinked properties of an ethylene copolymer produced using a titanium halide catalyst system are contrasted with the crosslinking behavior and the resulting crosslinked properties of an ethylene copolymer produced using a metallocene catalyst system.

The ethylene copolymer produced using a titanium halide catalyst system comprised ethylene and hexene. This ethylene copolymer can be purchased from the Phillips Petroleum Company. It had a density of approximately 0.956 grams per cubic centimeter and a melt index of approximately 18 grams per 10 minutes.

The ethylene copolymer produced using a metallocene catalyst system also comprised ethylene and hexene. It had a density of approximately 0.952 grams per cubic centimeter and a melt index of approximately 16 grams per 10 minutes.

The metallocene catalyst system was prepared as follows. A slurry containing 35 grams of L-90 Cab-0-Sil fumed silica and 800 milliliters of hexane was added to a ten gallon Pfaudler reactor under nitrogen. The Cab-0-Sil had been dried at 150° C. and evacuated before mixing it with the hexane to form the slurry. After adding the slurry to the reactor, six gallons of hexane was also added to the reactor. While stirring the contents of the reactor, 7.25 pounds of a solution containing ten percent by weight methylaluminoxane and 90 percent by weight toluene, was added to the reactor. While continuing to stir the contents of the reactor, a solution containing 300 milliliters of toluene and 48 grams of trimethoxyboroxine was added to the reactor over a one hour period. The resulting mixture was then stirred for three hours.

The mixture was then dumped from the reactor into five-gallon carboys under nitrogen. The solids were allowed to settle and the solvent was decanted. Three gallons of hexane was then charged to each carboy and the solids were washed. The solids were again allowed to settle and the solvent was decanted. This washing and decanting process was repeated two more times. The washed solids were mixed with 0.5 gallons of hexene to form a slurry and this slurry was then added to the 10 gallon Pfaudler. The reactor was heated to 80° C. and the slurry was stirred for fifteen minutes. The reactor was then cooled to ambient temperature and the slurry was decanted into a carboy. The solids were allowed to settle and the solvent was decanted. The slurry was then returned to the 10 gallon Pfaudler reactor.

While the slurry was stirred, a solution containing 4.5 grams of dissolved bis(n-butylcyclopentadienyl) zirconium dichloride, 550 milliliters of hexane, and 50 milliliters of toluene, was added to the reactor over a one hour period. The slurry was then stirred for four more hours.

The Pfaudler reactor was then cooled to 10° C. Ethylene was introduced to the reactor to prepolymerize the catalyst. The prepolymerization was run at a reactor temperature of 10° C. until a pressure drop of 45 pounds of ethylene was achieved from a 75.7 liter vessel. The mixture was then stirred for an additional hour.

The resulting catalyst was collected, filtered in an inert-atmosphere dry box, and dried. Total yield of catalyst was approximately 500 grams. The catalyst was analyzed to be approximately 60% prepolymer with a molecular weight ($M_w$) of 175,000 and molecular weight distribution (MWD) of 5.16.

The dried catalyst was ground to a fine powder. A slurry was prepared, in an approximately 1.7 liter catalyst charge vessel, that contained 190 grams catalyst, 20 grams of trimethylaluminum-treated HS-5 Cab-0-Sil fumed silica, and 1 liter of hexane. This catalyst slurry was used for the polymerization described below.

An ethylene 1-hexene copolymer was produced using the catalyst system produced above. This copolymer was produced in an approximately 26 gallon pipe loop reactor. Isobutane was the diluent. Hydrogen was used to control the molecular weight. The reactor was operated at 195.1° C. with a residence time of 1.15 hours and a pressure of 590 psi. At steady state conditions, the isobutane feed rate was 63.1 pounds/hour, the ethylene feed was 27 pounds/hour and the hexene feed rate was 0.27 pounds/hour. The copolymer was removed from the reactor at the rate of approximately 24 pounds/hour.

The copolymer produced over a 15 hour period was combined into one lot. The fluff density was 0.9527 grams per cubic centimeter and the melt index was 16.2 grams per 10 minutes.

Each of the two types of ethylene copolymers described above was compounded as follows. The copolymer fluff was divided into 1000 gram portions. To one portion of the fluff was added 3.6 grams of triallyl cyanurate. The triallyl cyanurate was added by first melting it in a container immersed in warm water. To the other portion of the fluff was added:

3.2 grams of 2,5-dimethyl-2,5-di(t-butylperoxy)hexyne-3;

10.2 grams of 2-hydroxy-4-n-octoxybenzophenone;

6.2 grams dilauryl thiodipropionate;

2.0 grams stearic acid; and 0.4 grams octadecyl-3,5-di-t-butyl-4-hydroxyhydrocinnimate.

The two portions of the fluff were then combined and blended in a Henschel mixer for thirty seconds at ambient temperature and 34 rpm. Similar samples comprising different additive levels were similarly prepared. These are detailed in Table One below.

TABLE ONE

| Compound Designation | A | B | C | D | E | F | G | H | I | J |
|---|---|---|---|---|---|---|---|---|---|---|
| Copolymer* | TH | TH | TH | TH | TH | ME | ME | ME | ME | ME |
| Copolymer Amount, Kg | 2 | 2 | 2 | 2 | 2 | 2 | 2 | 2 | 2 | 2 |
| Triallyl Cyanurate, g | 3.6 | 7.2 | 14.4 | 18.0 | 21.6 | 3.6 | 7.2 | 14.4 | 18.0 | 21.6 |
| 2,5-Dimethyl-2,5-di-(t-butylperoxy)-hexyne-3, g | 3.2 | 6.4 | 12.7 | 15.9 | 19.1 | 3.2 | 6.4 | 12.7 | 15.9 | 19.1 |
| 2-Hydroxy-4-n-octoxybenzophenone, g | 10.2 | 10.2 | 10.2 | 10.2 | 10.2 | 10.2 | 10.2 | 10.2 | 10.2 | 10.2 |
| Dilauryl thiodipropionate, g | 6.2 | 6.2 | 6.2 | 6.2 | 6.2 | 6.2 | 6.2 | 6.2 | 6.2 | 6.2 |
| Stearic acid, g | 2.0 | 2.0 | 2.0 | 2.0 | 2.0 | 2.0 | 2.0 | 2.0 | 2.0 | 2.0 |
| Octadecyl-3,5-di-t-butyl-4-hydroxyhydrocinnimate, g | 0.4 | 0.4 | 0.4 | 0.4 | 0.4 | 0.4 | 0.4 | 0.4 | 0.4 | 0.4 |

*TH = Titanium halide catalyst system, ME = Metallocene catalyst system

Each mixture prepared above was fed to a Brabender twin screw extruder using a twin screw K-tron T20 feeder at 20 rpm. The Brabender extruder was operated at a barrel temperature of 150° C. and a screw speed of 10 rpm. Pelletizer speed was 19.5 rpm. Approximately 500 grams of each formulation was thus extruded and pelletized.

Rheological Testing was accomplished as follows. Pelletized material from above was used to generate torque curves using a Monsanto Oscillating Disk Cure Rheometer, Model 100, at 204° C. The Monsanto Rheometer Test Procedure is well known in the art. Further information on these types of tests and rheometers can be found in U.S. Pat. Nos. 3,954,907 and 4,018,852. The results are shown in Table 2, below.

TABLE TWO

| | Rheological Testing Results | | | |
|---|---|---|---|---|
| Sample | Maximum Torque, Nm | Minutes to Max. Torque | Minutes to Crosslinking Onset | Crosslinking Rate, Nm/min.* |
| A | 6.4 | 4.10 | 1.55 | 2.14 |
| B | 14.4 | 3.55 | 1.45 | 7.81 |
| C | 25.7 | 3.70 | 1.31 | 15.0 |

TABLE TWO-continued

Rheological Testing Results

| Sample | Maximum Torque, Nm | Minutes to Max. Torque | Minutes to Crosslinking Onset | Crosslinking Rate, Nm/min.* |
|---|---|---|---|---|
| D | 41.3 | 3.70 | 1.30 | 27.1 |
| E | 43.5 | 3.80 | 1.31 | 30.6 |
| F | 7.1 | 4.20 | 1.70 | 2.57 |
| G | 18.4 | 4.20 | 1.55 | 9.38 |
| H | 34.1 | 4.00 | 1.40 | 17.4 |
| I | 51.2 | 4.20 | 1.35 | 31.9 |
| J | 56.0 | 4.95 | 1.33 | 40.0 |

*The slope of the line tangent to the torque curve at the inflection point.

The results in Table Two shows that, at a given level of crosslinking agent, the copolymer produced with a metallocene catalyst system crosslinks faster (higher rate of crosslinking) and to a greater degree (higher maximum torque) than does the copolymer produced with a titanium halide catalyst system.

The Samples were tested as follows. The crosslinked, molded specimens from above were used for the following tests. Samples of the proper dimensions were die cut from the molded plaques. The results of the testing are shown in Table Three which follows.

| Test | Method |
|---|---|
| Tensile Yield | D638-91 |
| Tensile Break | D638-91 |
| Tensile Elongation at Break | D638-91 |
| Density | D1505-85 |
| Gel Content | Small weighed pieces from molded plaques are boiled in xylene for 24 hours. Remaining insoluble material is dried and weighed. Weight of insoluble material expressed as a percent of total original weight is termed "gel content", |

TABLE THREE

Test Results*

| Sample | A | B | C | D | E | F | G | H | I | J |
|---|---|---|---|---|---|---|---|---|---|---|
| Density, g/cc | | | | | | | | | | |
| 3 min | 0.9480 | 0.9448 | 0.9408 | 0.9394 | 0.9387 | 0.9447 | 0.9408 | 9.9378 | 0.9359 | 0.9351 |
| 5 min | 0.9479 | 0.9447 | 0.9408 | mm*** | 0.9391 | 0.9397 | 0.9406 | 0.9390 | 0.9358 | 0.9351 |
| Elongation at Break % | | | | | | | | | | |
| 3 min | 303 | 356 | 469 | 451 | 444 | 468 | 1036 | 635 | 484 | 328 |
| 5 min | 272 | 414 | 503 | 327 | 477 | 436 | 826 | 692 | 537 | 308 |
| Tensile Strength at Break, ksi | | | | | | | | | | |
| 3 min | 0.95 | 1.46 | 2.15 | 2.31 | 2.35 | 1.12 | 4.23 | 2.97 | 2.51 | 2.01 |
| 5 min | 0.9 | 1.63 | 2.13 | 1.94 | 2.57 | 1.00 | 3.31 | 3.26 | 2.79 | 1.89 |
| Strain Energy, psi | | | | | | | | | | |
| 3 min | 6351 | 7434 | 10118 | 9503 | 9411 | 9533 | 27655 | 13949 | 9835 | 6524 |
| 5 min | 5688 | 8516 | 10589 | 6697 | 10454 | 8754 | 20184 | 15786 | 11514 | 5994 |
| Gel, % | | | | | | | | | | |
| 3 min | 60.3 | 76.9 | 85.9 | 88.3 | 89.3 | 1.2(1.4)** | 84.6 | 86.4 | 92.5 | 95.3 |
| 5 min | 57.8 | 77.5 | 85.0 | 88.7 | 86.7 | 0.9(1.6)** | 83.0 | 87.1 | 89.5 | 95.2 |

*The "3 min" and "5 min" under each property refers to the hold time at temperature (curing time) when molding, as indicated in the section molding earlier in this Example.
**Number in parentheses is the value obtained upon a retest.
***nm = Not Measured.

Samples were molded as follows. Each sample of pellets from above was compression molded into ⅛"×5"×5" plaques using a Pasadena hydraulic press at 232° C. with a 30 ksi clamp pressure, a "picture frame" mold, a one-minute preheat time, a one-minute pressurization time, and a one-minute cooling time. Two series of plaques were molded from each sample: One with a three-minute holding time at temperature and one with a five-minute holding time at temperature.

Example Two

The methods and procedures detailed in Example One were used to generate and test four additional samples which differed from those in Example One only in the level of additives present. The sample identifications and additive levels are given in Table Four, below. The results of the rheological testing of the compounds detailed in Table Four are given below in Table Five. Additional test results on the compounds detailed in Table Four are given below in Table Six.

TABLE FOUR

Additional Test Compounds

| Compound Designation | K | L | M | N |
|---|---|---|---|---|
| Copolymer Type* | TH | TH | ME | ME |
| Copolymer Amount, Kg | 2 | 2 | 2 | 2 |
| Triallyl cyanurate, g | 1.44 | 10.8 | 1.44 | 10.8 |
| 2,5-Dimethyl-2,5-di—(t-butylperoxy)-hexyne-3, g | 1.27 | 9.53 | 1.27 | 9.53 |
| 2-Hydroxy-4-n-octadecylbenzophenone, g | 10.2 | 10.2 | 10.2 | 10.2 |
| Dilauryl thiodipropionate, g | 6.2 | 6.2 | 6.2 | 6.2 |
| Stearic acid, g | 2.0 | 2.0 | 2.0 | 2.0 |
| Octadecyl-3,5-di—t-butyl-4-hydroxyhydro-cinnimate, g | 0.4 | 0.4 | 0.4 | 0.4 |

*TH = Titanium halide, ME = Metallocene

TABLE FIVE

Additional Rheological Testing Results

| Sample | Maximum Torque, Nm | Minutes to Max. Torque | Minutes to Crosslinking Onset | Crosslinking Rate, Nm/min.* |
|---|---|---|---|---|
| K | ** | ** | ** | ** |
| L | 16.7 | 4.46 | ** | 7.94 |
| m | 2.2 | ** | ** | 0.34 |
| n | 20.6 | 4.3 | ** | 11.32 |

*The slope of the line tangent to the torque curve at the inflection point.
**Could not be resolved from Monsanto Cure Rheometer 100 torque plot.

TABLE SIX

Additional Test Results*

| Sample | K | L | M | N |
|---|---|---|---|---|
| Density, g/cc | | | | |
| 3 min | 0.9505 | 0.9419 | 0.9475 | 0.9399 |
| 5 min | 0.9507 | 0.9417 | 0.9479 | 0.9400 |
| Elongation at Break, % | | | | |
| 3 min | 242 | 232 | 360 | 926 |
| 5 min | 205 | 388 | 359 | 1000 |
| Tensile Strength at Break, ksi | | | | |
| 3 min | 1.50 | 1.95 | 1.04 | 2.06 |
| 5 min | 1.62 | 1.85 | 1.35 | 3.59 |
| Strain Energy, psi | | | | |
| 3 min | 5375 | 5177 | 7777 | 22123 |
| 5 min | 4719 | 8416 | 7718 | 24621 |
| Gel, % | | | | |
| 3 min | 0.0 | 66.1 | 0.5 | 86.2 |
| 5 min | 0.2 | 77.2 | 1.1 | 87.6 |

*The "3 min" and "5 min" under each property refers to the hold time at temperature (curing time) when molding, as indicated in the section on molding in Example One.

Example Three

In this Example, compounds made as indicated in Examples One and Two were used to rotomold objects which were then tested. The molding, testing, and results are described below.

The compounds were rotomolded as follows. A Ferry RS-220 hot air rotational molding machine with 95 inch spherical mold area, one cart, and offset arm was used with one of three molds. The mold referenced below as "⅛" Aluminum Box" was a 12" cube made from ¼" aluminum sheet such that the parting line passes along opposite edges of the cube and across adjacent ends. For testing, only the four sides of the molded part free of a parting line are used. The mold referenced as "¾" Cylinder" below was made of a 10¾" OD aluminum pipe that is ⁵⁄₁₆" thick and 12.5" long, with a 0.5" aluminum sheet end cap on each end. The caps have relief cuts such that the pipe is recessed slightly into the cap when the mold is assembled. The mold is used to mold a cylindrical part with a ¾" wall thickness. The mold referenced below as "Trash Container" was a 14-gauge fabricated stainless steel mold with a flat plate lid. It produces a 95-gallon trash container configured for axle mounting of wheels and designed for use with automated pickup systems. It is used to produce a part with a wall thickness of about 0.200–0.220". The trash container is approximately 40 inches tall with a circular cross section. The cross section is approximately 24 inches in diameter at the bottom, tapering to a diameter of approximately 27" at a slant height of about 29" from the bottom. The body then tapers to a diameter of approximately 34" at the top. The top, and the area near the top, is modified by having "flats" on the two sides such that the maximum width from side to side is 31 inches, allowing the container to pass through a 32 inch wide door. Molding times and temperatures are detailed in what follows, as are the compositions of the compounds used.

The compounds were tested as follows (Note: Only the test procedures not previously described, or differing from those previously described, are described here.)

Gel content: The procedure differed from that previously described only in that the xylene used contained, in grams, 1% of the ml volume of xylene used, of Plastinox 2246 antioxidant and the boiling time was 16 hours instead of 24.

Dart impact test: A one-inch diameter dart of the indicated weight, with a ½" radius rounded tip, is dropped onto the center of a 5×"5" flat test specimen of the indicated thickness, supported in a sample holder with a 3½" diameter circular hole in the center. Impact strength, in foot pounds, is calculated by multiplying the weight of the dart by the drop height, in feet, at which 50% failure occurs. Eight specimens are tested at each height. It is noted whether the failures are brittle (indicated by an "x") or ductile (indicated by an asterisk). If the test is run at other than room temperature, it is so noted.

Trash container impact test: This test is a modification of the one described immediately above. It differs from it in that test specimens are always 0.2" thick and cut from the Snyder trash containers described previously. The sample holder has a 2½" diameter circular hole in the center, rather than 3½". The dart weight is always ten pounds. Finally, the drop height is initially ten feed and is decreased if necessary until a height is reached at which some specimens "pass" (do not break and are not penetrated). This height is used to calculate the impact strength reported and the number of failures at this height are noted, along with whether the failures are brittle or ductile in nature.

The tables which follow give the results of this study.

TABLE SEVEN

Rotomolding Results

| Compound[1] | A | B | C | D | E |
|---|---|---|---|---|---|
| Density, g/cc | 0.955[2] | 0.953 | 0.953 | 0.950 | 0.950 |
| Melt Index | 18[2] | 16 | 16 | 30 | 30 |
| ⅛" Aluminum Box[3] | | | | | |

TABLE SEVEN-continued

Rotomolding Results

| Compound[1] | A | B | C | D | E |
|---|---|---|---|---|---|
| Dart Impact Strength at −40° C. F, 10 lb. weight, ft. lb. | | | | | |
| 7 min. | 18*4 | 45*3 | 35*5 | 50*5 | 25*5 |
| 8 min. | 65 | 65 | 60 | 65 | 55 |
| 9 min. | 60 | 70 | 65 | 55 | 60 |
| 10 min. | 65 | 65 | 55 | 55 | 55 |
| 12 min. | 70 | 60 | 70 | 65 | 50 |
| 14 min. | 60 | 70 | 70 | 60 | 50*1 |
| 16 min. | 65 | 55 | 65 | 55 | 50 |
| Density, g/cc | 0.943 | 0.939 | 0.943 | 0.938 | 0.941 |
| Tensile Strength, psi | 2800 | 2650 | 2850 | 2550 | 2700 |
| Elongation, % | 84 | 92 | 90 | 90 | 79 |
| Gel Content, % | 84 | 92 | 90 | 90 | 79 |
| ¾" Cylinder[4] | | | | | |
| Dart Impact Strength at −40° F., 30 lb. weight, ft. lb. | >270 | >270 | >270 | >270 | >270 |
| Gel Content, % (ID)[5] | 86 | 91 | 92 | 90 | 84 |
| Trash Container[6] Dart Impact Strength, 20 lb. weight, ft. lb. | | | | | |
| 11 min. | Not Run | Not Run | Not Run | 120 | 110 |
| 15 min. | 130 | 120 | 120 | 120 | 110 |
| Trash Container Impact Strength, ft. lb. | | | | | |
| 11 min. | Not Run | Not Run | Not Run | >100 | 100 × 1 |
| 15 min. | >100 | >100 | >100 | >100 | 100 × 2 |

[1]Compound compositions are given in Table Eight.
[2]Density and melt index not determined on Compound A. The values given are the nominal values for the copolymer fluff used to make Compound A.
[3]Molded at 600° F. for the times indicated.
[4]Molded at 500° F. 70 minutes.
[5]Gel samples were taken either from the inside surface of the part (indicated by "ID") or from the outside surface (indicated by "OD").
[6]Molded at 600° F. for the indicated times.

TABLE EIGHT

Compounds Used in Rotomolding Study[a]

| Compound | A | B | C | D | E |
|---|---|---|---|---|---|
| Copolymer Type[b] | TH | ME | ME | ME | ME |
| Triallyl Cyanurate | 0.70 | 0.70 | 0.35 | 0.70 | 0.35 |
| 2,5-Dimethyl-2,5-(t-butylperoxy)-hexyne-3 | 0.55 | 0.55 | 0.275 | 0.55 | 0.275 |
| 2-Hydroxy-4-n-octoxybenzo-phenone | 0.50 | 0.50 | 0.50 | 0.50 | 0.50 |
| Dilauryl-thiodipropionate | 0.30 | 0.30 | 0.30 | 0.30 | 0.30 |
| Stearic acid | 0.10 | 0.10 | 0.10 | 0.10 | 0.10 |
| Octadecyl-3,5-di—t-butyl-4-hydroxyhydro-cinnimate | 0.020 | 0.020 | 0.020 | 0.020 | 0.020 |

[a]Numbers in the table are the weight percent of the indicated material in the total composition of the compound.
[b]TH = Copolymer produced with a titanium halide catalyst system.
ME = Copolymer produced with a metallocene catalyst system.

Comparing the 7 and 8 minute −40° F. impact strengths (⅛" aluminum box) of Compound A with those of Compound J shows that the copolymer produced with a metallocene catalyst system (Compound J) crosslinks faster than does the copolymer produced with a titanium halide catalyst system (Compound A) since the impact strength of Compound J has already reached 45 foot pounds at 7 minutes while that of Compound A is only 10 foot pounds at this time.

That the copolymers produced with a metallocene catalyst system crosslink more efficiently or thoroughly than do corresponding copolymers produced with a titanium halide catalyst can be seen by comparing the gel content (⅛" aluminum box) of Compound A with that of Compound B. The 92% gel content of Compound B indicates a greater degree of crosslinking than does the 84% gel content of Compound A.

Because the copolymers produced with a metallocene catalyst system crosslink faster and more thoroughly than do the copolymers produced with a titanium halide catalyst system, it is possible to use lower amounts of peroxide in the metallocene-based compounds and still achieve crosslinking speeds and efficiencies that are at least as good as those obtained when using larger amounts of peroxide in copolymer produced with a titanium halide catalyst system. This can be seen by comparing the 7 and 8 minute −40° F. dart impact strengths and gel contents (⅛" aluminum box) of Compounds A and C. It can be seen that, at 7 minutes, the impact strength of Compound C is already better than that of Compound A even though Compound A contains twice the peroxide that Compound C does. The impact strengths of the two compounds at longer molding times are similar. The gel content of Compound C is higher than that of Compound A (indicating more thorough crosslinking), again, even though the former has only half the peroxide of the latter.

For a copolymer produced with a metallocene catalyst system, it appears that a copolymer with lower melt index may crosslink more thoroughly. This is indicated by a comparison of the ⅛" aluminum box gel contents of Compounds C and E and the corresponding values for −40° F. impact strengths at all molding times, as well as by a comparison of the OD gel contents (¾" cylinder) of these two compounds. The lower melt index compounds may also crosslink slightly faster than their higher melt index counterparts (compare the 7 minute −40° F. dart impact strengths of Compounds C and E).

That which is claimed:

1. An ethylene copolymer composition that comprises:
   (a) an ethylene copolymer that has been produced with a metallocene catalyst system, wherein said ethylene copolymer comprises ethylene and an alpha-olefin selected from the group consisting of 1-butene, 3-methyl-1-butene, 1-pentene, 3-methyl-1-pentene, 4-methyl-1-pentene, 1-hexene, 3-ethyl-1-hexene, 1-heptene, 1-octene, 1-nonene, and 1-decene, and wherein said ethylene copolymer has a density in the range of about 0.85 to about 0.96 grams per cubic centimeter and a melt index in the range of about 0.01 to about 100 grams per 10 minutes;
   (b) a crosslinking agent, wherein said crosslinking agent is an organic peroxide, and wherein said organic peroxide is present in said composition in an amount in the range of from about 0.05 weight percent to about 0.8 weight percent based on the weight of said copolymer; and
   (c) a coagent selected the group consisting of organic compounds that have allyl ($CH_2CH=CH_2$) groups, 1.2 polybutadiene, and mixtures thereof, wherein said coagent is present in said composition in an weight ratio of the coagent to crosslinking agent from about 0.2 to about 4.

2. A composition according to claim 1 wherein said ethylene copolymer has a density in the range of about 0.94 to about 0.96 grams per cubic centimeter and a melt index in the range of about 3 to about 40 grams per 10 minutes.

3. A composition according to claim 2 wherein said ethylene copolymer has a melt index in the range of 10 to 35 grams per 10 minutes.

4. A composition according to claim 3 wherein said wherein said organic peroxide is present in said composition in an amount in the range of 0.16 weight percent to 0.64 weight percent based on the weight of said copolymer.

5. A composition according to claim 4 wherein said organic peroxide is present in said composition in an amount in the range of 0.16 weight percent to 0.48 weight percent based on the weight of said copolymer.

6. A composition according to claim 5 wherein said organic peroxide is present in said composition in an amount in the range of from 0.24 weight percent to 0.40 weight percent based on the weight of said copolymer.

7. A composition according to claim 6 wherein said coagent is present in said composition in an weight ratio of the coagent to crosslinking agent from about 0.3 to about 3.

8. A composition according to claim 7 wherein said coagent is present in said composition in an weight ratio of the coagent to crosslinking agent from about 0.5 to about 2.

9. An ethylene copolymer composition that comprises:
(a) an ethylene copolymer that has been produced with a metallocene catalyst system, wherein said ethylene copolymer comprises ethylene and an alpha-olefin selected from the group consisting of 1-butene, 3-methyl-1-butene, 1-pentene, 3-methyl-1-pentene, 4-methyl-1-pentene, 1-hexene, 3-ethyl-1-hexene, 1-heptene, 1-octene, 1-nonene, and 1-decene, and wherein said ethylene copolymer has a density in the range of about 0.85 to about 0.96 grams per cubic centimeter and a melt index in the range of about 0.01 to about 100 grams per 10 minutes;
(b) a crosslinking agent, wherein said crosslinking agent is an organic peroxide, and wherein said organic peroxide, which contains active oxygen, is present in an amount that supplies said composition with an amount of active oxygen, and wherein said amount of active oxygen is in the range of about 50 to about 750 parts per million by weight based on the weight of said copolymer; and
(c) a coagent selected the group consisting of organic compounds that have allyl ($CH_2CH=CH_2$) groups, 1,2 polybutadiene, and mixtures thereof, wherein said coagent is present in said composition in an weight ratio of the coagent to crosslinking agent from about 0.2 to about 4.

10. A composition according to claim 9 wherein said ethylene copolymer has a density in the range of about 0.94 to about 0.96 grams per cubic centimeter and a melt index in the range of about 3 to about 40 grams per 10 minutes.

11. A composition according to claim 10 wherein said ethylene copolymer has a melt index in the range of 10 to 35 grams per 10 minutes.

12. A composition according to claim 11 wherein said organic peroxide, which contains active oxygen, is present in an amount that supplies said composition with an amount of active oxygen, wherein said amount of active oxygen is in the range of 150 to 640 parts per million by weight based on the weight of said copolymer.

13. A composition according to claim 12 wherein said organic peroxide, which contains active oxygen, is present in an amount that supplies said composition with an amount of active oxygen, wherein said amount of active oxygen is in the range of 150 to 470 parts per million by weight based on the weight of said copolymer.

14. A composition according to claim 13 wherein said organic peroxide, which contains active oxygen, is present in an amount that supplies said composition with an amount of active oxygen, wherein said amount of active oxygen is in the range of 220 to 390 parts per million by weight based on the weight of said copolymer.

15. A composition according to claim 14 wherein said coagent is present in said composition in an weight ratio of the coagent to crosslinking agent from about 0.3 to about 3.

16. A composition according to claim 15 wherein said coagent is present in said composition in an weight ratio of the coagent to crosslinking agent from about 0.5 to about 2.

17. A process to produce an ethylene copolymer composition said process comprising crosslinking an ethylene copolymer composition that comprises:
(a) an ethylene copolymer that has been produced with a metallocene catalyst system, wherein said ethylene copolymer comprises ethylene and an alpha-olefin selected from the group consisting of 1-butene, 3-methyl-1-butene, 1-pentene, 3-methyl-1-pentene, 4-methyl-1-pentene, 1-hexene, 3-ethyl-1-hexene, 1-heptene, 1-octene, 1-nonene, and 1-decene, and wherein said ethylene copolymer has a density in the range of about 0.85 to about 0.96 grams per cubic centimeter and a melt index in the range of about 0.01 to about 100 grams per 10 minutes;
(b) a crosslinking agent, wherein said crosslinking agent is an organic peroxide wherein said organic peroxide is present in said composition in an amount in the range of from about 0.05 weight percent to about 0.8 weight percent based on the weight of said copolymer; and
(c) a coagent selected the group consisting of organic compounds that have allyl ($CH_2CH=CH_2$) groups, 1,2 polybutadiene, and mixtures thereof, wherein said coagent is present in said composition in an weight ratio of the coagent to crosslinking agent from about 0.2 to about 4.

18. A process according to claim 17 wherein said ethylene copolymer has a density in the range of about 0.94 to about 0.96 grams per cubic centimeter and a melt index in the range of about 3 to about 40 grams per 10 minutes.

19. A process according to claim 18 wherein said ethylene copolymer has a melt index in the range of 10 to 35 grams per 10 minutes.

20. A process according to claim 19 wherein said wherein said organic peroxide is present in said composition in an amount in the range of 0.16 weight percent to 0.64 weight percent based on the weight of said copolymer.

21. A process according to claim 20 wherein said organic peroxide is present in said composition in an amount in the range of 0.16 weight percent to 0.48 weight percent based on the weight of said copolymer.

22. A process according to claim 21 wherein said organic peroxide is present in said composition in an amount in the range of from 0.24 weight percent to 0.40 weight percent based on the weight of said copolymer.

23. A process according to claim 22 wherein said coagent is present in said composition in an weight ratio of the coagent to crosslinking agent from about 0.3 to about 3.

24. A process according to claim 23 wherein said coagent is present in said composition in an weight ratio of the coagent to crosslinking agent from about 0.5 to about 2.

25. A process to produce an ethylene copolymer composition said process comprising crosslinking an ethylene copolymer composition that comprises:
  (a) an ethylene copolymer that has been produced with a metallocene catalyst system, wherein said ethylene copolymer comprises ethylene and an alpha-olefin selected from the group consisting of 1-butene, 3-methyl-1-butene, 1-pentene, 3-methyl-1-pentene, 4-methyl-1-pentene, 1-hexene, 3-ethyl-1-hexene, 1-heptene, 1-octene, 1-nonene, and 1-decene, and wherein said ethylene copolymer has a density in the range of about 0.85 to about 0.96 grams per cubic centimeter and a melt index in the range of about 0.01 to about 100 grams per 10 minutes;
  (b) a crosslinking agent, wherein said crosslinking agent is an organic peroxide, wherein said organic peroxide, which contains active oxygen, is present in an amount that supplies said composition with an amount of active oxygen, and wherein said amount of active oxygen is in the range of about 50 to about 750 parts per million by weight based on the weight of said copolymer; and
  (c) a coagent selected the group consisting of organic compounds that have allyl ($CH_2CH=CH_2$) groups, 1,2 polybutadiene, and mixtures thereof, wherein said coagent is present in said composition in an weight ratio of the coagent to crosslinking agent from about 0.2 to about 4.

26. A process according to claim 25 wherein said ethylene copolymer has a density in the range of about 0.94 to about 0.96 grams per cubic centimeter and a melt index in the range of about 3 to about 40 grams per 10 minutes.

27. A process according to claim 26 wherein said ethylene copolymer has a melt index in the range of 10 to 35 grams per 10 minutes.

28. A process according to claim 27 wherein said organic peroxide, which contains active oxygen, is present in an amount that supplies said composition with an amount of active oxygen, wherein said amount of active oxygen is in the range of 150 to 640 parts per million by weight based on the weight of said copolymer.

29. A process according to claim 28 wherein said organic peroxide, which contains active oxygen, is present in an amount that supplies said composition with an amount of active oxygen, wherein said amount of active oxygen is in the range of 150 to 470 parts per million by weight based on the weight of said copolymer.

30. A process according to claim 29 wherein said organic peroxide, which contains active oxygen, is present in an amount that supplies said composition with an amount of active oxygen, wherein said amount of active oxygen is in the range of 220 to 390 parts per million by weight based on the weight of said copolymer.

31. A process according to claim 30 wherein said coagent is present in said composition in an weight ratio of the coagent to crosslinking agent from about 0.3 to about 3.

32. A process according to claim 31 wherein said coagent is present in said composition in an weight ratio of the coagent to crosslinking agent from about 0.5 to about 2.

33. A crosslinked ethylene copolymer composition produced by the process of claim 17.

34. A crosslinked ethylene copolymer composition produced by the process of claim 18.

35. A crosslinked ethylene copolymer composition produced by the process of claim 19.

36. A crosslinked ethylene copolymer composition produced by the process of claim 20.

37. A crosslinked ethylene copolymer composition produced by the process of claim 21.

38. A crosslinked ethylene copolymer composition produced by the process of claim 22.

39. A crosslinked ethylene copolymer composition produced by the process of claim 23.

40. A crosslinked ethylene copolymer composition produced by the process of claim 24.

41. A crosslinked ethylene copolymer composition produced by the process of claim 25.

42. A crosslinked ethylene copolymer composition produced by the process of claim 26.

43. A crosslinked ethylene copolymer composition produced by the process of claim 27.

44. A crosslinked ethylene copolymer composition produced by the process of claim 28.

45. A crosslinked ethylene copolymer composition produced by the process of claim 29.

46. A crosslinked ethylene copolymer composition produced by the process of claim 30.

47. A crosslinked ethylene copolymer composition produced by the process of claim 31.

48. A crosslinked ethylene copolymer composition produced by the process of claim 32.

* * * * *